United States Patent [19]

Stönner et al.

[11] Patent Number: 5,716,524

[45] Date of Patent: Feb. 10, 1998

[54] PROCESS OF EXTRACTING PHENOLS FROM A PHENOL-CONTAINING WASTE WATER BY MEANS OF A SOLVENT MIXTURE

[75] Inventors: Hans-Martin Stönner, Eschborn; Matthias Linicus, Hattersheim; Gert Ungar, Frankfurt, all of Germany

[73] Assignee: Metallgesellschaft Aktiengesellschaft, Frankfurt, Germany

[21] Appl. No.: 804,595

[22] Filed: Feb. 24, 1997

[30] Foreign Application Priority Data

Mar. 2, 1996 [DE] Germany .................. 198 08 463.6

[51] Int. Cl.⁶ .................................................. B01D 11/04
[52] U.S. Cl. .................. 210/634; 210/639; 210/909
[58] Field of Search .................. 210/634, 638, 210/639, 511, 909; 568/749, 750

[56] References Cited

U.S. PATENT DOCUMENTS

| | | | |
|---|---|---|---|
| 3,956,112 | 5/1976 | Lee | 210/634 |
| 4,025,423 | 5/1977 | Stonner | 210/638 |
| 4,400,553 | 8/1983 | Aneja | 210/806 |
| 4,518,502 | 5/1985 | Burns | 210/634 |
| 4,789,468 | 12/1988 | Sirkar | 210/137 |
| 4,921,612 | 5/1990 | Sirkar | 210/634 |
| 4,925,565 | 5/1990 | Adams | 210/634 |
| 4,944,882 | 7/1990 | Ray | 210/640 |

*Primary Examiner*—Ernest G. Therkorn
*Attorney, Agent, or Firm*—Sprung Kramer Schaefer & Briscoe

[57] ABSTRACT

Phenols are extracted from a phenol-containing waste water by means of two solvents A and B. The waste water is first of all passed through a first extraction zone, and then through a second extraction zone. To the first extraction zone a mixture of the solvents A and B is supplied, and into the second extraction zone at least one of the two solvents is introduced. From the first extraction zone, solvent-mixture loaded with phenols is withdrawn, phenols am separated therefrom, and the solvents are used again in at least one of the extraction zones. Solvent B is lower-boiling and has a lower water solubility at a temperature in the range from 10° to 60° C. than solvent A. Solvent B has a water solubility at 40° C. of up to 2 wt.-% and a boiling point at 1 bar of 50° to 100° C., and it is miscible with solvent A. Solvent A has a boiling point at 1 bar of not more than 172° C. and a water solubility at 40° C. of not more than 5 wt.-%.

5 Claims, 1 Drawing Sheet

# 5,716,524

PROCESS OF EXTRACTING PHENOLS FROM A PHENOL-CONTAINING WASTE WATER BY MEANS OF A SOLVENT MIXTURE

DESCRIPTION

This invention relates to a process of extracting phenols from a phenol-containing waste water by means of a solvent mixture, where the waste water is first of all passed through a first extraction zone and then through a second extraction zone, and where the solvent mixture is supplied to the first extraction zone and at least one of the solvents of the mixture is introduced into the second extraction zone, solvent mixture loaded with phenols is withdrawn from the first extraction zone, phenols are separated therefrom, and the solvents are used again in at least one extraction zone. Such an extraction by means of two solvents should preferably be effected with as little steam as possible.

Such process is known from "Chemical Engineering Progress" (May 1977), pp. 67 to 73. The loaded solvent mixture is supplied to a first distillation zone, and the lower-boiling solvent is stripped from the top and recirculated to the second extraction zone. In a second distillation zone, the phenols are separated from the remaining solvent mixture, and the solvent withdrawn at the top is recirculated to the first extraction zone. In the known process, relatively high-pressure steam of preferably at least 10 bar is required for effecting the separation of the high-boiling solvent from the extracted phenol mixture.

It is the object underlying the invention to save energy when extracting phenols by means of a solvent mixture, and to flexibly effect the distillative separation of the phenols and the separation of the solvent mixture prior to its reuse. In accordance with the invention, this is achieved in the above-stated process in that a waste water, which contains at least one component from the group of phenols, with a pH of 6 to 10 and usually 7 to 9 is supplied to the first extraction zone, that a mixture of the solvents A and B is passed through the first extraction zone at temperatures between 10° and 60° C. and mostly 30° to 50° C., wherein solvent B is lower-boiling and has a lower water solubility at a temperature in the range from 10° to 60° C. than solvent A, solvent B has a water solubility at 40° C. of up to 2 wt-% (preferably not more than 1 wt-%) and a boiling point at 1 bar of 50° to 100° C. (and preferably 60° to 75° C.), and a distribution factor D for resorcinol of at least 0.5 and preferably 1 to 2, and solvent B is miscible with solvent A, wherein solvent A has a boiling point at 1 bar of not more than 172° C. and usually not more than 160° C., a water solubility at 40° C. of not more than 5 wt-% (preferably not more than 2 wt-%) and a distribution factor D for resorcinol of at least 5 and preferably 7 to 20. The distribution factor D is defined as C1/C2, where C1 is the equilibrium concentration of resorcinol in solvent B or A, and C2 is the equilibrium concentration of resorcinol in the waste water. In the process of the invention, solvent B is introduced into the second extraction zone at temperatures in the second zone of 10 to 60° C. and mostly 30° to 50° C., and solvent B leaving the second extraction zone, which has absorbed solvent A from the waste water, is supplied to the first extraction zone. From the second extraction zone, a treated low-phenol waste water is withdrawn, which has a content of not more than 50 ppm monovalent phenols and a resorcinol content corresponding to a removal of at least 90% of the resorcinol contained in the supplied waste water. The solvent mixture loaded with phenols, which has been withdrawn from the first extraction zone, is separated in a first distillation zone, where from the top of the first distillation zone a phenol-free mixture of solvents B and A is withdrawn, and from the bottom of the first distillation zone a phenol-containing solvent mixture is withdrawn. From the phenol-free mixture of solvents B and A, which has been withdrawn from the first distillation zone, part of solvent B is separated in a second distillation zone, this part of solvent B is supplied to the second extraction zone, and the remaining solvent mixture is supplied to the first extraction zone. Resorcinol is one of the divalent phenols, which is usually contained in the waste water to be treated. Resorcinol is hard to extract, and is therefore utilized here as relevant substance.

The waste water to be treated originates for instance from the gasification of coal, and in particular from the gasification of coal in a fixed bed, or from the hydrogenation or carbonization of coal.

As solvent A there can for instance be used a ketone, an ester, a ketone mixture, an ester mixture or a ketone-ester mixture. Only to give an example for solvent A, methyl isobutyl ketone (MIBK) as well as n-butyl acetate or isobutyl acetate are mentioned.

For solvent B, ether or ether mixtures should be used above all, and only to give an example the following are mentioned: diisopropyl ether (DIPE), ethyl-t-butyl ether (ETBE) or t-amyl-ethyl ether (TAME).

The treated waste water withdrawn from the second extraction zone has a content of not more than 50 ppm and usually not more than 5 ppm monovalent phenols. It is achieved that the content of resorcinol in the treated waste water corresponds to a removal of at least 90% and preferably at least 99% of the resorcinol content in the untreated waste water. The treated waste water, which comes from the second extraction zone, is passed through at least one stripping zone and is in addition heated to temperatures of 100° to 180° C. and preferably at least 130° C. By means of stripping and heating it is possible to purify the waste water to such an extent that it can be directly supplied to a biological waster water purification. It is no longer necessary that before or after the biological waste water purification, the phenol-free waste water is passed through an adsorption filter, e.g. an activated-carbon filter.

In known processes employing only one solvent which has very good extraction properties (e.g. MIBK or butyl acetate), the distillation of the solvent from phenol requires a relatively large amount of high-pressure steam (10 bar or more). In addition, an even larger amount of low-pressure steam is required for stripping solvent from the raffinate. The process described in "Chemical Engineering Progress" (see above), which employs two solvents, does not require steam for stripping solvent from the water, but an additional effort is required for effecting the condensation of the second solvent, as the same cannot be condensed with cooling water at a pressure of 1 bar. The known "Phenosolvan" process (Lurgi) is the energetically most favorable of the known processes, as both for the distillation of the solvent from phenol and for stripping the solvent from the raffinate, the waste heat of the bottom product of the $NH_3$ stripping column is used. Only for stripping minor solvent quantities from crude phenol a small amount of steam is required. The disadvantage of this process lies in the fact that at solvent ratios required for a complete extraction of the polyvalent phenols the waste heat of the waste water is not sufficient for the distillation.

The process in accordance with the invention combines the advantages and eliminates the disadvantages of the aforementioned processes in that it uses two solvents with suitable properties as regards boiling point, water solubility and distribution factor.

In the inventive process, the utilization of the waste heat of the waste water from the $NH_3$ stripping column can be effected as follows: At least in part through an indirect heat exchange, the heated waste water is supplied to one distillation zone or also to both distillation zones, where it acts as a heating medium through an indirect heat exchange. One possibility of this indirect heat exchange consists in the fact that in the first distillation zone liquid is passed to the outside through an intermediate outlet, and the liquid is heated with heated waste water, before it is returned to the distillation zone.

It is in addition recommended to preheat the solvent mixture loaded with phenols, which has been withdrawn from the first extraction zone, before it enters the first distillation zone. This preheating can be effected in different ways. One special possibility of preheating consists in partly evaporating the phenol-containing solvent mixture when the same is preheated. This can be done in one stage or in several stages. Preferably, vapours are introduced into a section of the distillation zone located at a higher level, and liquid is introduced into a lower section.

BRIEF DESCRIPTION OF THE DRAWINGS

Embodiments will now be explained with reference to the drawing, wherein.

DESCRIPTION OF THE PREFERRED EMBODIMENTS

Figure 1:
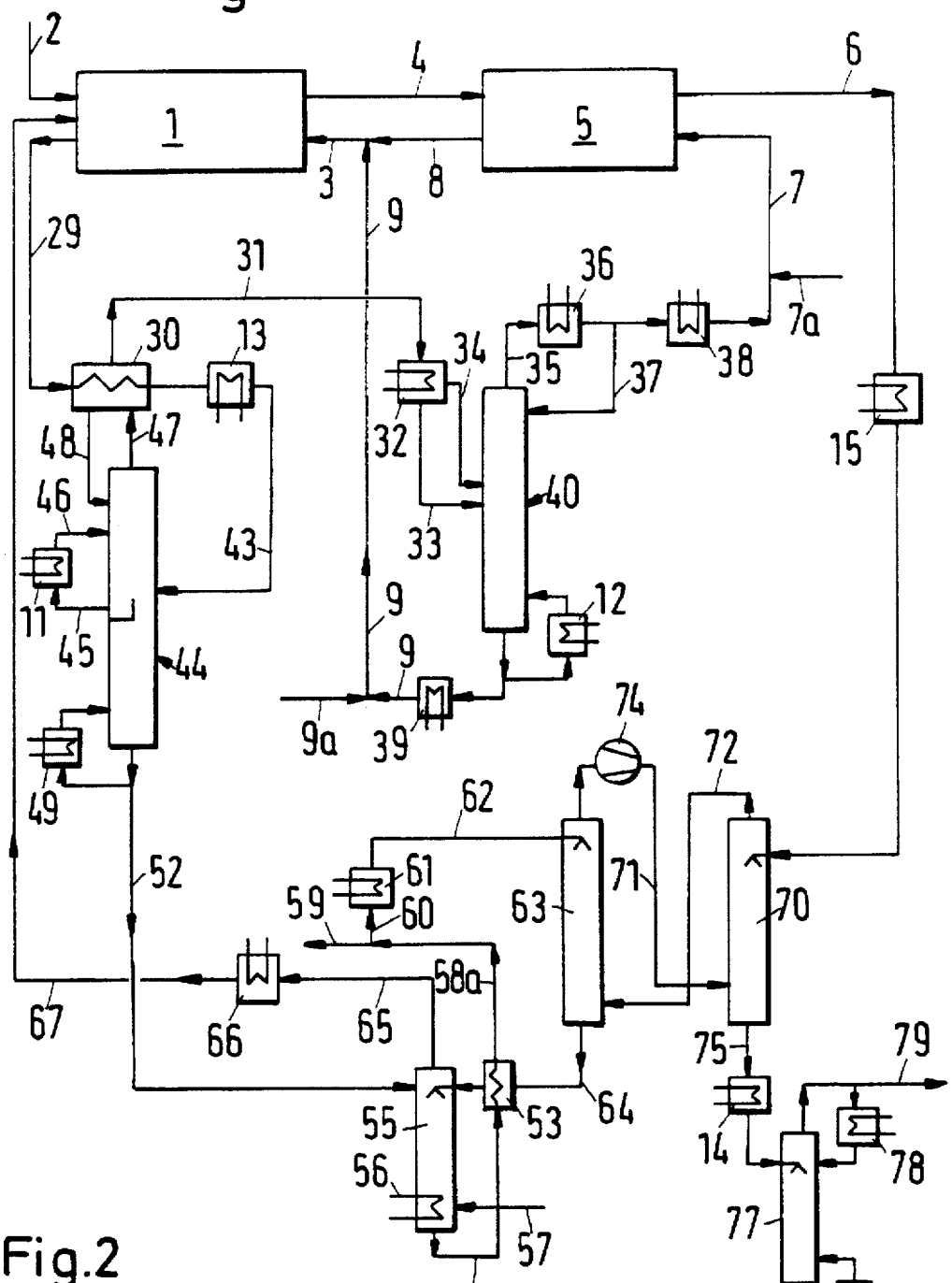
FIG. 1 represents a flow diagram of the process.

As shown in FIG. 1, the phenol-containing waste water to be treated is supplied to the first extraction zone (1) through line (2). A mixture of solvents A and B is supplied through line (3) to the first extraction zone. The waste water treated in the first extraction zone is delivered through line (4) to the second extraction zone (5) and is withdrawn via line (6) as virtually phenol-free waste water. Solvent B is supplied through line (7) to the second extraction zone, where it chiefly serves to remove solvent A from the waste water. A mixture of solvents A and B leaves the second extraction zone (5) through line (8) and together with a mixture of solvents A and B from line (9) is delivered through line (3) to the first extraction zone (1).

Usually, each extraction zone consists of a plurality of series-connected extraction stages. When extraction stages of the mixer-settler type are used, see FIG. 2, the first extraction zone (1) comprises for instance 3 to 10 stages, and the second extraction zone (5) comprises 1 to 6 stages, but the number of extraction stages can be varied as required.

Figure 2:
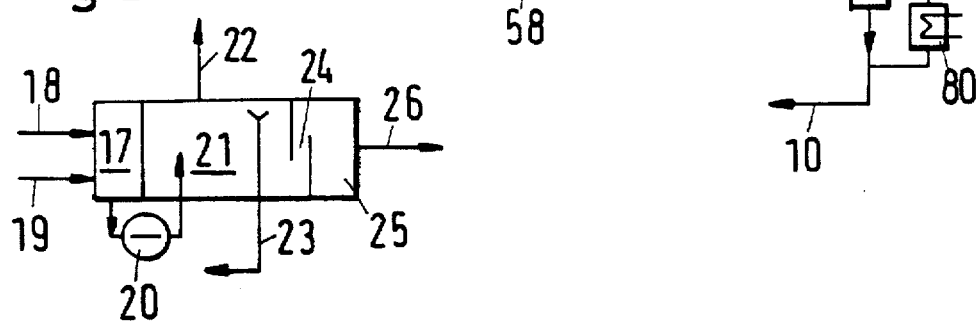
FIG. 2 shows a single extraction stage of the mixer-settler type.

The extractor schematically represented in FIG. 2 comprises an inlet chamber (17) with an inlet (18) for waste water and a line (19) for the solvent mixture. From the chamber (17), which also serves as mixing chamber, the mixture is supplied by means of the pump (20) to a separating chamber (21), which has a gas outlet (22). In the chamber (21) the heavy water phase separates from the lighter solvent phase. The light phase is withdrawn through line (23), and the water phase flows through the opening (24) first of all to the collecting chamber (25) and then through line (26) to the next extractor. Extractors of the type described in FIG. 2 are commercially available.

Solvent mixture, which is chiefly loaded with the absorbed phenols, is withdrawn from the first extraction zone (1) through line (29) and is heated through an indirect heat exchange in the preheater (30). The solvents evaporate partly or largely in the succeeding heater (13), before the mixture is delivered via line (43) to the first distillation zone (44). Other than represented in the drawing, line (43) can be divided into two lines, and vapours can be introduced into a higher section and liquid into a lower section of the distillation zone (44). The mixture of solvents A and B withdrawn from the top of the first distillation zone (44) through line (47) serves as heating medium in the preheater (30). The vaporous solvent mixture is withdrawn via line (31), is passed through a condenser (32), and a condensate is obtained which chiefly consists of solvent A. This condensate is delivered via line (33) to the second distillation zone (40). The vapour phase, which chiefly consists of solvent B, is withdrawn from the condenser (32) through line (34), and expediently slightly above the orifice of line (33) is likewise delivered to the second distillation zone (40). The separation in the second distillation zone (40) is effected in a manner known per se by means of an indirect heat exchanger (12), and from the top through line (35) with a first cooling (36), partial reflux through line (37) and second cooling (38) solvent B is withdrawn, which is recirculated via line (7) to the second extraction zone. Fresh solvent B is supplied, if necessary, through line (7a). The mixture of solvents A and B obtained at the bottom of the second distillation zone (40) is recirculated through the cooler (39) and then through line (9) to the first extraction zone (1). Fresh solvent A is added, if necessary, through line (9a). The mixture in line (9) contains the solvents A and B usually in a weight ratio of 1:10 to 3:1, the temperature of line (9) usually is about 40° C.

In the first distillation zone (44) part of the liquid present in zone (44) is constantly delivered through an intermediate outlet (45) to the outside to an indirect heat exchanger (11), in which part of the liquid is evaporated, before steam and liquid are recirculated through line (46) to the first distillation zone (44). The vaporous top product of the first distillation zone (44) is first of all delivered to the heat exchanger (30) through line (47), where condensate is recirculated via line (48). By means of the heater (49), which is usually heated with steam, a temperature of about 150° C. is adjusted at the bottom of the distillation zone (44).

Each of the two distillation zones (44) and (40) is realized in practice through one or more distillation columns, which in a manner known per se contain liquid- and vapour-permeable trays or packings.

A liquid mixture whose main components are phenols and solvent residues leaves the first distillation zone (44) through line (52) and is supplied to the column (55), which here is also referred to as phenol column. It comprises a heating (56) of the bottom liquid, and for stripping purposes steam is supplied through line (57). The temperature at the bottom usually lies in the range from 130° to 170° C., and preferably 140° to 150° C. From the bottom of column (55) crude phenol is withdrawn through line (58), is passed through the heat exchanger (53) for cooling purposes, and then flows through line (58a). A partial stream of the crude phenol is removed from the process as product through line (59). The remaining crude phenol is delivered through line (60) to a cooler (61) and then through line (62) to a column (63), which here is also referred to as absorber. Solvent-containing liquid withdrawn from the bottom of the column (63) is supplied through line (64) and the heat exchanger (53) to the phenol column (55) after having been preheated. The top product of the phenol column (55) is withdrawn via line (65), is cooled in the condenser (66), and the condensate produced is recirculated via line (67) to the first extraction zone (1). This condensate chiefly consists of water and solvent, and also contains residual phenols.

The treated waste water withdrawn via line (6) from the second extraction zone (5) is first of all heated in the indirect heat exchanger (15) and then added to a stripping column (70). Through line (71) recycle gas is supplied to the stripping column as stripping gas, which wholly or partly consists of inert gas (e.g. nitrogen). The recycle gas loaded with solvent, which has been withdrawn from the stripping column (70), flows through line (72) to the absorber (63), where solvent is removed. Gas withdrawn from the top of the absorber (63) is recirculated to the stripping column (70) via the blower (74). If necessary, the gas of line (71) can also be passed through a not represented water washing for removing phenols.

The waste water, which is withdrawn from the bottom of the stripping column (70) through line (75), is first of all delivered to the indirect heat exchanger (14) for being heated, and from there to a further column (77). By means of heating, disturbing gases are stripped off from this column, where the top product is partly recirculated via the condenser (78). The remaining partial stream of the exhaust gas, which chiefly consists of $NH_3$, $CO_2$, $H_2S$ and steam, is withdrawn via line (79).

The bottom liquid of the column (77) is heated by means of steam, which in the indirect heat exchanger (80) serves as heating medium. Via line (10) waste water is withdrawn from the column (77) at a temperature in the range from 100° to 180° C., and preferably at least 130° C. This waste water has now already been purified to such an extent that after a further cooling it can be directly delivered to a not represented waste water purification. It is important that in the above described process the heat of the waste water in line (10) is properly utilized. For this purpose it is possible, for instance, to pass the waste water as heating medium in succession through the heat exchangers (11), (12), (13), (14) and (15), where this order can also be varied. So as not to impair the clarity of FIG. 1, this circulation of the waste water is not represented.

EXAMPLE

To a plant as shown in FIG. 1 a phenol-containing waste water from a coal gasification plant is supplied through line (2), which waste water had largely been liberated from tar, oil and solids prior to the extraction treatment. Solvent A is methyl isobutyl ketone (MIBK), and solvent B is diisopropyl ether (DIPE). Per hour, 7 kg DIPE and 0.1 kg MIBK are supplied to the plant through line (7a) and (9a), respectively, so as to compensate losses. 900 kg/h steam serve as stripping medium in line (57). In Tables I and II, the quantities and the components of the liquid (in kg/h) as well as the temperature (in ° C.) and the pressure (in bar) are indicated for the various lines; the data have in part been calculated.

TABLE I

| Line | 2 | 4 | 6 | 7 | 8 | 9 | 10 | 29 | 31 |
|---|---|---|---|---|---|---|---|---|---|
| Quantity | 105594 | 106914 | 107396 | 9863 | 9380 | 13467 | 99593 | 23445 | 21935 |
| $H_2O$ | 100000 | 100656 | 100891 | 324 | 89 | — | 99579 | 324 | 324 |
| $NH_3$ | 1500 | 1500 | 1500 | — | — | — | 10 | — | — |
| $CO_2$ | 3500 | 3500 | 3500 | — | — | — | — | — | — |
| $H_2S$ | 100 | 100 | 100 | — | — | — | — | — | — |
| MIBK | — | 363 | 5 | 0.01 | 358 | 9355 | — | 10183 | 9354 |
| DIPE | — | 790 | 1396 | 9539 | 8933 | 4112 | — | 12263 | 12257 |
| Phenol | 263 | 0.1 | 0.01 | 0.002 | 0.1 | — | 0.01 | 423 | 0.002 |
| Cresols | 107 | — | — | — | — | — | — | 133 | — |
| Xylenol | 34 | — | — | — | — | — | — | 34 | — |
| Resorcinol | 82 | 4 | 4 | — | — | — | 4 | 78 | — |
| Pitch | 8 | — | — | — | — | — | — | 8 | — |
| Temperature | 35 | 35 | 35 | 35 | 35 | 35 | 140 | 35 | 102 |
| Pressure | 1.5 | 1.5 | 1.5 | 1.2 | 1.5 | 1.4 | 1.4 | 1.5 | 1.3 |

TABLE II

| Line | 43 | 52 | 58 | 59 | 62 | 64 | 67 | 75 | 79 |
|---|---|---|---|---|---|---|---|---|---|
| Quantity | 23445 | 1510 | 8679 | 499 | 8184 | 8312 | 2044 | 106002 | 6409 |
| $H_2O$ | 324 | — | 158 | 9 | 149 | 149 | 891 | 100891 | 1312 |
| $NH_3$ | — | — | — | — | — | 61 | 61 | 1500 | 1490 |
| $CO_2$ | — | — | — | — | — | 19 | 19 | 3500 | 3500 |
| $H_2S$ | — | — | — | — | — | 47 | 47 | 100 | 100 |
| MIBK | 10183 | 829 | 0.5 | — | 5 | 5 | 833 | 0.1 | 0.1 |
| DIPE | 12263 | 6 | 0.1 | — | 0.1 | 2 | 8 | 7 | 7 |
| Phenol | 423 | 423 | 4538 | 263 | 4275 | 4275 | 160 | 0.01 | — |
| Cresols | 133 | 133 | 1846 | 107 | 1739 | 1739 | 26 | — | — |
| Xylenol | 34 | 34 | 587 | 34 | 553 | 553 | — | — | — |
| Resorcinol | 78 | 78 | 1411 | 78 | 1333 | 1333 | — | 4 | — |
| Pitch | 8 | 8 | 138 | 8 | 130 | 130 | — | — | — |
| Temperature | 98 | 153 | 140 | 80 | 35 | 55 | 35 | 50 | 100 |
| Pressure | 1.5 | 1.5 | 1.2 | 1.2 | 1.2 | 1.2 | 1.2 | 1.2 | 1.8 |

We claim:

1. A process of extracting phenols from a phenol-containing waste water by means of a solvent mixture, where the waste water is first of all passed through a first extraction zone and then through a second extraction zone, and where the solvent mixture is supplied to the first extraction zone, and at least one of the solvents of the mixture is supplied to the second extraction zone, solvent mixture loaded with phenols is withdrawn from the first extraction zone, phenols are separated therefrom, and the solvents are used again in at least one extraction zone, characterized in that (a) a waste water, which contains at least one component from the group of phenols, is supplied to the first extraction zone with a pH of 6 to 10, that a mixture of the solvents A and B at temperatures between 10° and 60° C. is passed through the first extraction zone, wherein solvent B is lower-boiling and has a lower water solubility at a temperature in the range from 10° to 60° C. than solvent A, solvent B has a water solubility at 40° C. of up to 2 wt-% and a boiling point at 1 bar of 50° to 100° C., and a distribution factor D for resorcinol of at least 0.5, and it is miscible with solvent A, wherein solvent A has a boiling point at 1 bar of not more than 172° C., a water solubility at 40° C. of not more than 5 wt-%, and a distribution factor D for resorcinol of at least 5, wherein D is defined as C1/C2, where C1 is the equilibrium concentration of resorcinol in solvent B or A, and C2 is the equilibrium concentration of resorcinol in the waste water, (b) solvent B is introduced into the second extraction zone at temperatures of 10° to 60° C. in the second zone, and solvent B leaving the second extraction zone, which has absorbed solvent A from the waste water, is supplied to the first extraction zone, from the second extraction zone a treated, low-phenol waste water is withdrawn, which has a content of not more than 50 ppm monovalent phenols and a resorcinol content corresponding to a removal of at least 90% of the resorcinol contained in the supplied waste water, (c) the solvent mixture loaded with phenols, which has been withdrawn from the first extraction zone, is separated in a first distillation zone, where from the top of the first distillation zone a phenol-free mixture of the solvents B and A is withdrawn, and from the bottom of the first distillation zone a phenol-containing solvent mixture is withdrawn, (d) from the phenol-free mixture of the solvents B and A, which has been withdrawn from the first distillation zone, part of the solvent B is separated in a second distillation zone, this part of the solvent B is supplied to the second extraction zone, and the remaining solvent mixture is supplied to the first extraction zone.

2. The process as claimed in claim 1, wherein the treated waste water, which has been withdrawn from the second extraction zone, is heated to temperatures in the range from 100° to 180° C. for stripping off dissolved gases, and at least in part through an indirect heat exchange the sensible heat of the treated, heated waste water is dissipated to at least one of the two distillation zones.

3. The process as claimed in claim 2, wherein the first distillation zone liquid is passed to the outside through an intermediate outlet, is heated with heated waste water, and heated liquid is recirculated to the first distillation zone.

4. The process as claimed in claim 1, wherein an ether or ether mixture is used as solvent B.

5. The process as claimed in claim 1, wherein a ketone, an ester, a ketone mixture, an ester mixture, or a ketone-ester mixture is used as solvent A.

* * * * *